(12) United States Patent
Moss

(10) Patent No.: US 7,785,169 B2
(45) Date of Patent: Aug. 31, 2010

(54) TURKEY CALL

(76) Inventor: James P. Moss, 11313 Yandell Dr., Louisville, KY (US) 40223

( * ) Notice: Subject to any disclaimer, the term of this patent is extended or adjusted under 35 U.S.C. 154(b) by 51 days.

(21) Appl. No.: 10/932,434

(22) Filed: Sep. 2, 2004

(65) Prior Publication Data
US 2006/0046608 A1    Mar. 2, 2006

(51) Int. Cl.
*A63H 5/00* (2006.01)
(52) U.S. Cl. .................. 446/418; 446/397; 84/411 R
(58) Field of Classification Search .......... 446/418, 446/397; 84/411 R
See application file for complete search history.

(56) References Cited

U.S. PATENT DOCUMENTS

| | | | | |
|---|---|---|---|---|
| 937,323 | A * | 10/1909 | McConaghy | 446/418 |
| 2,047,784 | A * | 7/1936 | Krakowski | 446/418 |
| 3,136,201 | A * | 6/1964 | Lang et al. | 84/411 R |
| 3,208,184 | A * | 9/1965 | Wisor | 446/397 |
| 3,478,932 | A * | 11/1969 | Phillips | 446/418 |
| 4,310,986 | A * | 1/1982 | Jacobs | 446/397 |
| 4,373,419 | A * | 2/1983 | Tuttrup | 84/411 R |
| 4,520,709 | A * | 6/1985 | Kester, Jr. | 84/415 |
| 4,586,912 | A * | 5/1986 | Adams | 446/418 |
| 4,787,876 | A * | 11/1988 | Nguyen et al. | 446/418 |
| 4,854,914 | A * | 8/1989 | White, Jr. | 446/397 |
| 4,875,885 | A * | 10/1989 | Johnson | 446/418 |
| 4,892,499 | A * | 1/1990 | Ayyoubi et al. | 446/418 |
| 5,419,430 | A * | 5/1995 | Wilson et al. | 84/411 R |
| 5,562,521 | A * | 10/1996 | Butler et al. | 446/418 |
| 6,095,888 | A | 8/2000 | Panepinto | |
| D431,008 | S | 9/2000 | Drury | |
| 6,417,432 | B1 * | 7/2002 | Downing | 84/411 R |
| 6,443,803 | B1 * | 9/2002 | Epple, Jr. | 446/418 |
| 6,580,023 | B2 * | 6/2003 | Belli | 84/411 R |
| 6,616,504 | B1 | 9/2003 | Forbes et al. | |
| 6,676,479 | B1 | 1/2004 | Zimmerman | |
| 6,780,079 | B2 * | 8/2004 | Musacchia, Jr. | 446/418 |
| 6,872,118 | B1 * | 3/2005 | Bishop | 446/418 |
| D511,471 | S * | 11/2005 | Cox | D10/116 |
| 7,008,290 | B1 * | 3/2006 | Bean | 446/397 |
| 7,353,974 | B2 * | 4/2008 | Arndt, III | 224/222 |
| 2005/0075042 | A1 * | 4/2005 | Vaicunas et al. | 446/418 |

* cited by examiner

*Primary Examiner*—Gene Kim
*Assistant Examiner*—Urszula M Cegielnik
(74) *Attorney, Agent, or Firm*—Tarolli, Sundheim, Covell & Tummino LLP

(57) ABSTRACT

An apparatus, kit and method are provided for a turkey call having an outer ring attached to a pot of a turkey call device such that an internal sounding board in the pot is free to vibrate and undampened by a user's grasp when a user scrapes the surface of the striking plate of the turkey call. The outer ring is attached to the pot by a connecting means. The striking plate is surrounded by the pot, which encloses the internal sounding board. The internal sounding board is mounted to the pot. The connecting means attaches the pot to the outer ring at a minimum number of points to leave the internal sounding board free to vibrate when the striker is used to scrape the surface of the striking plate of the turkey call.

17 Claims, 3 Drawing Sheets

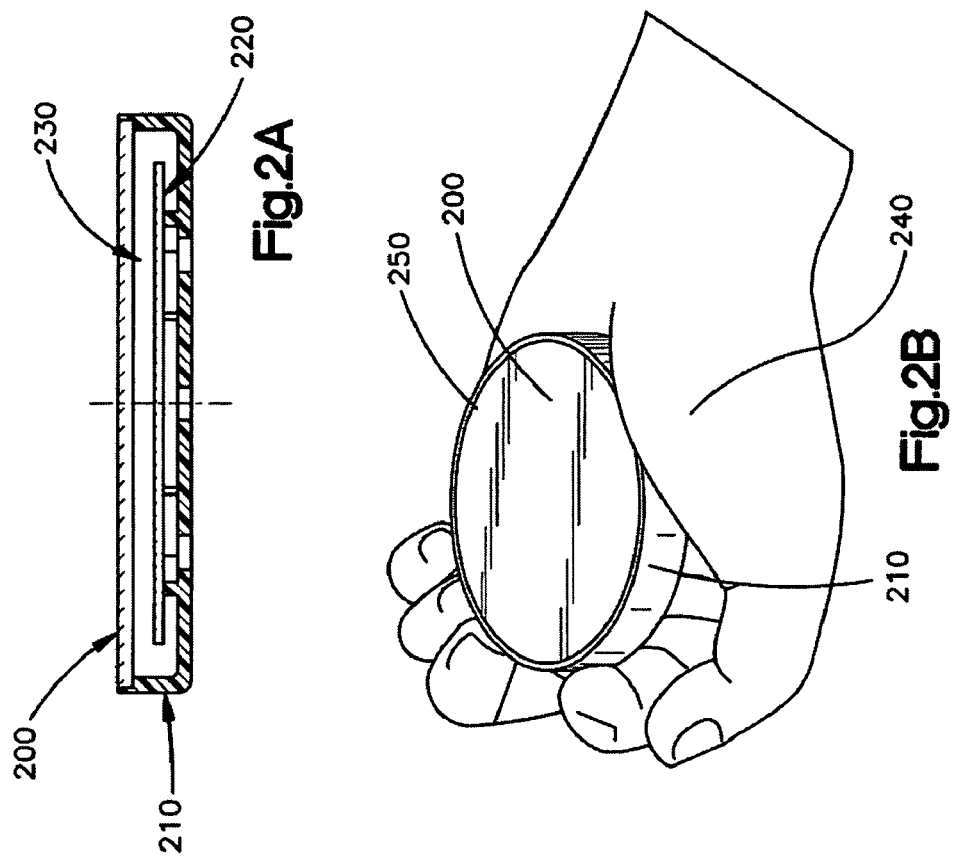
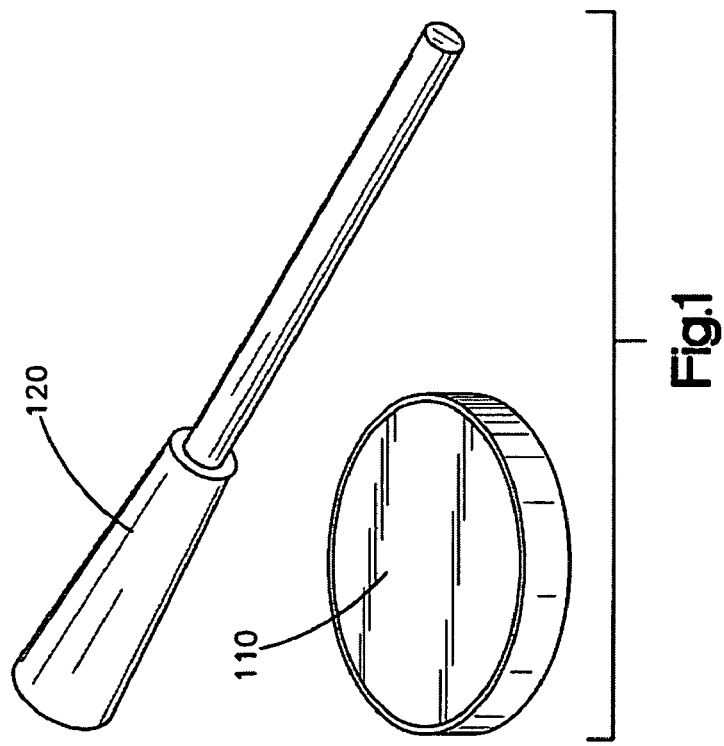

TURKEY CALL

TECHNICAL FIELD

The present invention relates to turkey calls, and more specifically, to an improved friction turkey call capable of producing a natural turkey sound without dampening the sound of the turkey call.

BACKGROUND OF THE INVENTION

Hunting wild turkeys is the fastest growing type of hunting in North America. The number of turkeys has increased dramatically with conservation and wildlife programs, thereby increasing hunting. Normally, the male turkey, the gobbler, gives a call to attract hens for mating. In hunting, the sequence is reversed and the hunter attempts to lure the gobbler by mimicking hen turkey sounds. The reversal of the normal mating process doesn't always work and the quality of the hunter's calling influences the success of the hunt.

There are four types of turkey calls known in the art. For example, there are "diaphragm" type turkey calls, "box" type turkey calls, "wing bone" turkey calls, and "slate" or "friction" turkey calls.

Diaphragm type turkey calls are operated by blowing across section of the turkey call with the mouth. This type of turkey call has the advantage of requiring no movement of the hands while the turkey is in his final approach. Box type turkey calls produce sound by friction. Wing bone calls are used but are less common.

The slate or "friction" type turkey call is the most commonly used turkey call in the United States. The friction type turkey call, as shown in FIG. 1, includes a striking plate 110 that produces artificial turkey sounds due to contact by and relative movement with a rigid striking rod or striking member 120. Sounds are made by scraping the striking member 120 over the surface of the striking plate 110.

A number of elements can contribute to the sound produced by a friction or slate turkey call. FIG. 2a is a cross-sectional view of the striking plate 110 of FIG. 1d. The composition of the surface 200, whether slate or ceramic, the material of the striker 120, whether wood or synthetic, and the composition of the pot 210 are all factors that affect the quality and type of sound produced by the turkey call. Further, the pot 210, which is usually made out of wood or plastic, has an internal sounding plate or board 220 that creates a chamber 230 both above and below it. The bottom of the pot usually has holes in it. The composition and type of sounding plate 220, and the quantity and position of the holes in the bottom of the pot 210 are additional factors that affect the quality and type of sound produced by the turkey call.

A user typically holds the pot 210 in one hand (usually the non-dominant hand) 240, and uses the other hand to scrape the striker over the surface 200 of the turkey call device 250, as shown in FIG. 2b. When the surface 200 is scratched, the outer shell (pot 210) of the turkey call 250 vibrates, producing resonance and overtones that improve the quality of the sound and make it more like the sound of the hen turkey. Among the problems encountered with slate or friction turkey calls is that when a user grasps the turkey call 250 tightly, the pitch of the sound goes upwards, causing the sound to be unnatural and does not mimic the sound of the hen turkey. Even the slightest compression of the pot 210 when grasped can affect the quality of the sound of the turkey call. Further, a user can grasp the turkey call differently every time, which makes it difficult for the user of the turkey call to consistently obtain the desired turkey sounds.

There remains, therefore, a need for an improved turkey call, and in particular, an improved turkey call in which the vibrations of the internal sounding board with the sounding chambers resonate freely and in unison with the pot, thus producing a more natural turkey sound that is unaffected by the grasp of the user. The striking plate and the internal sounding board should be able to vibrate freely, where the sound quality of the turkey call is not affected when grasped. There is also a need for an improved turkey call that allows for desired turkey sounds to be produced consistently each time a user scratches the surface of the turkey call device.

SUMMARY OF THE INVENTION

Therefore, it is an object of the present invention to provide a turkey call device that allows the turkey call device to freely vibrate, and produce a clear sound that resembles the natural call of a wild turkey when a user grips the turkey call device.

Accordingly, a turkey call is provided comprising a striking plate, a pot, an internal sounding board enclosed by the pot and the striking plate, an outer ring, and connecting means for connecting the outer ring to the pot.

Further, an apparatus for use with a friction turkey call device is provided, the apparatus comprising an outer ring that surrounds a perimeter of the friction turkey call device, and connecting means for connecting the outer ring to the perimeter of the friction turkey call device.

Also provided is a method of making a friction turkey call, comprising the steps of providing an outer ring around a perimeter of a friction turkey call device, connecting the outer ring to the perimeter of the friction turkey call device, and scraping a surface of the friction turkey call device to produce a sound.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

These and other features, aspects, and advantages of the apparatus and methods of the present invention will become better understood with regard to the following description, appended claims, and accompanying drawings where:

FIG. 1 is a "slate" or "friction" turkey call known in the art.

FIG. 2(a) is a cross-section view of the "slate" or "friction" turkey call of FIG. 1.

FIG. 2(b) depicts a user's hand gripping the "slate" or "friction" turkey call of FIG. 1.

DETAILED DESCRIPTION

Although this invention may be applicable to the calling of various animals for different purposes, it has been found particularly useful in the environment of calling turkeys for hunting purposes. Therefore, without limiting the applicability of the invention to turkey calls, the invention will be described in such environment.

Figure 3A:
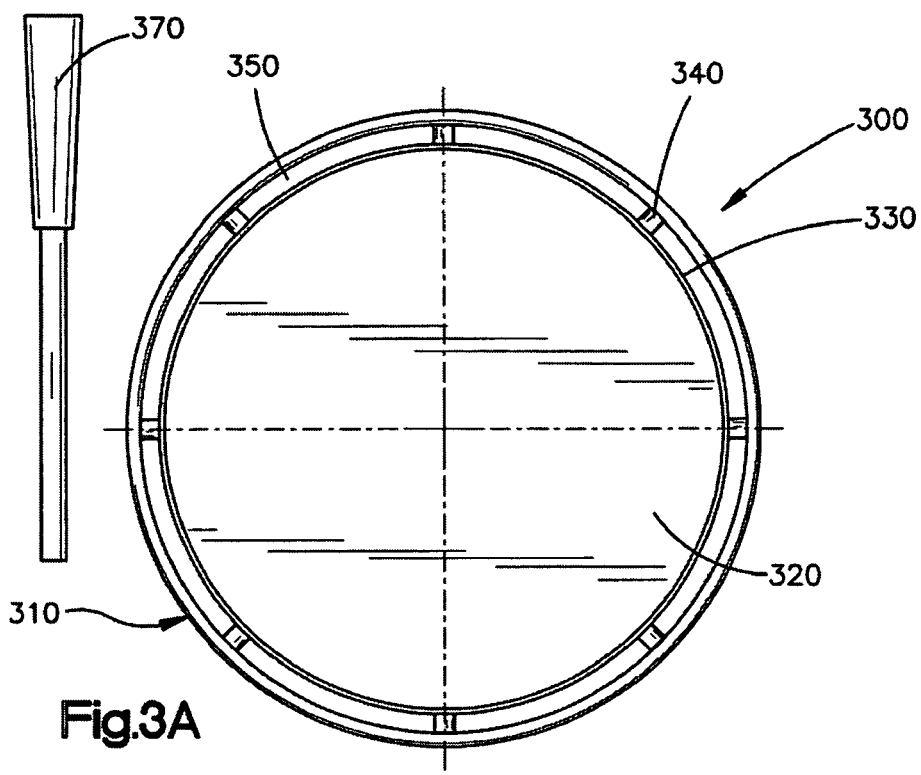
FIG. 3(a) is a top view of an example embodiment of the present invention.

With reference now to the drawings, the components of the present invention will be described. FIG. 3(a) shows a top view of a turkey call 300 in accordance with an example embodiment of the present invention. A circular outer ring 310 surrounds a pot 330, whose perimeter or circumference encloses a perimeter or circumference of a circular-shaped striking plate 320. The pot 330 and striking plate encloses an internal sounding board (not shown). The pot 330 is connected at a minimum number of points by a connecting means 340 that connects the pot 330 to the outer ring 310.

Preferably, the striking plate 320 can be formed of slate, glass, ceramic material, or a metal, such as, for example, aluminum, or by any combination of these materials, in order to best obtain the desired artificial turkey sounds. The pot 330 and outer ring 310 can be formed of glass, frictionite, carbon, wood, plastic, or other similar materials. The striker 370 can be made out of different types of wood, plastic, and carbon.

The outer ring 310 can also comprise a belt, strap or other solid structure designed to go around the pot 330 and attach to the pot 330 by the same connecting means 340. Thus, the outer ring 310 and connecting means 340 could be a separate structure that attaches to existing slate or friction turkey calls shown in FIG. 1, by way of the connecting means 340 connecting the outer ring 310 to the pot of the prior art slate or friction turkey calls. Clips or other mechanical means may be used as the connecting means 340 if a glass, frictionite, carbon, wood, plastic or other similar material is used as the outer ring 310, or some type of adhesive or bonding agent if a belt or strap is used as the outer ring 310.

Preferably, the connecting means 340 is made of a similar material as the outer ring 310 and pot 330, and the pot 330 is connected to the outer ring 310 at a minimum number of points so as to not dampen the vibration of the internal sounding board of the turkey call 300 when the striking plate 320 is struck by the striker 370. The connecting means 340 is preferably connected to the pot 330 at substantially equally spaced points around the circumference of the pot 330, as shown in FIG. 3(a). The number of points is preferably eight, as shown in FIG. 3(a) where the connecting means 340 connects the outer ring 310 to the pot 330 at eight different points. However, the pot 330 should be connected to the outer ring 310 at least at one point, and can be connected up to an unlimited number of points. Hollow spaces 350 exist between each point where the connecting means 340 is located. The connecting means 340 also may allow the outer ring 310 to be detachable or slidably removable from the pot 330.

The pot 330 can be connected or attached to the outer ring 310 in various different ways, such as by the use of small attachment devices as the connecting means 340. The attachment devices may be mechanical attachments such as pins, or pieces that are connected to the pot 330 and outer ring 310 by glue, cement, resin, or any other sort of similar bonding agent. If the outer ring 310 is a belt, strap or other structure, the connecting means may be some type of clips, self adhesive or similar bonding agent. Further, the turkey call device 300 can be manufactured such that the outer circumference of the pot 330, the outer ring 310 and the connecting means are made of the same material, and cutouts or hollow spaces 350 are made in the turkey call 300 to form the connecting means 340 that attaches the pot 330 to the outer ring 310.

Figure 3B:
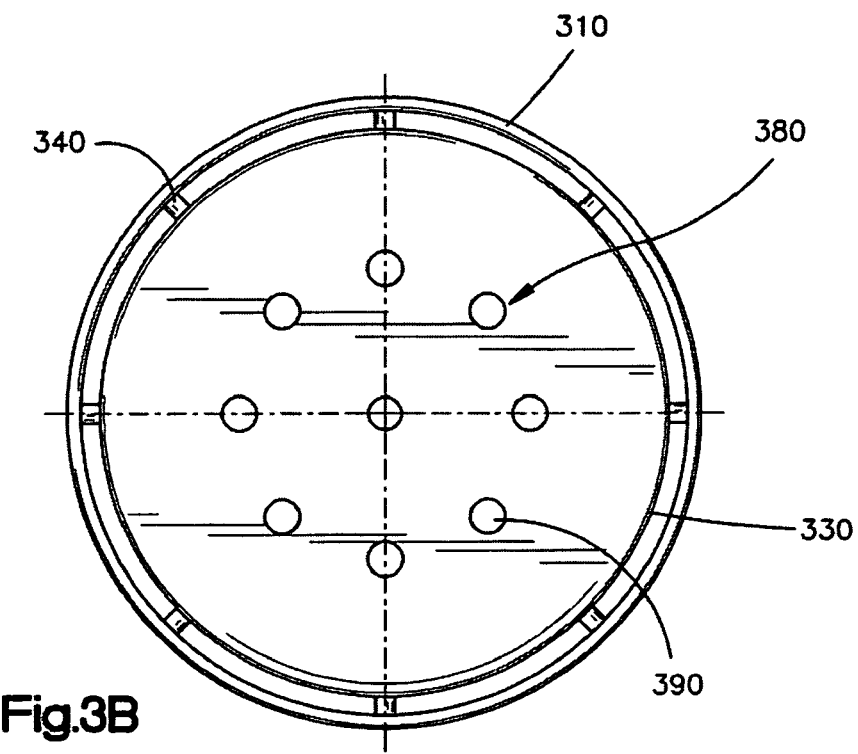
FIG. 3(b) is a bottom view of the example embodiment of the present invention.

FIG. 3(b) shows a bottom view of the preferred embodiment of the present invention. Preferably, the bottom of the pot 330 has holes 380 formed at regularly spaced intervals in a circular manner and in the center of the pot 310, as seen in FIG. 3(b). The internal sounding board 390 is visible through the holes 380, and can be made of wood, glass, frictionite, carbon, or other similar materials used in the art for internal sounding boards of slate or friction turkey calls. The internal sounding board 390 can be mounted to the pot 330 inside the pot 330 by a pin mechanism, similar to how the internal sounding board 220 is mounted to the pot 210 in FIG. 2a. The internal sounding board 390 can also be mounted to the pot 330 by any other similar attachments known in the art that serve so as to not dampen or reduce the vibration of the internal sounding board 390 when the striker 370 is used on the striking plate 320.

Alternatively, the outer ring 310 can also be connected directly to the striking plate 320 by way of the connecting means 340. In this structure, the striking plate 320 would have a structure to enclose the internal sounding board inside of it, without the use of the pot. Thus, the striking plate 320 could be directly connected to the outer ring 310 by the connecting means.

Figure 4:
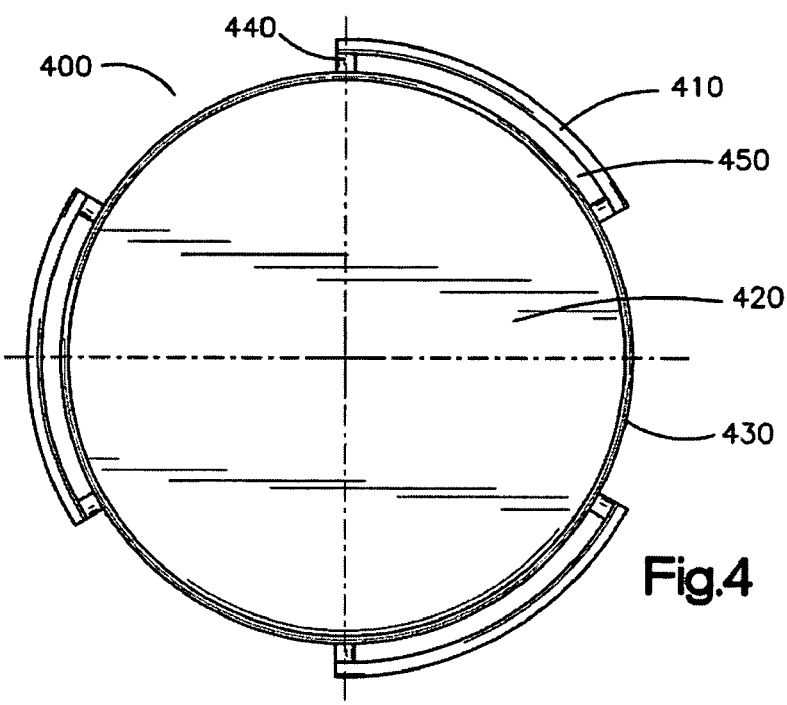
FIG. 4 is a view of an alternative example embodiment of the present invention having a segmented outer ring.

FIG. 4 shows an alternative embodiment of the turkey call 400 of the present invention in which the outer ring 410 is segmented so that it partially or substantially surrounds the pot 430. The perimeter or circumference pot 430 encloses a perimeter or circumference of a striking plate 420, and similar cutouts or hollow spaces 450 appear between the outer ring 410, pot 430 and connecting means 440 as in the embodiment of FIGS. 3(a)-3(b). A connecting means 440 connects the outer ring 410 to the pot 430. A user can grip the turkey call 400 by holding the segments of the outer ring 410, leaving the internal sounding board (not shown) inside the pot free to vibrate.

Figure 5A:
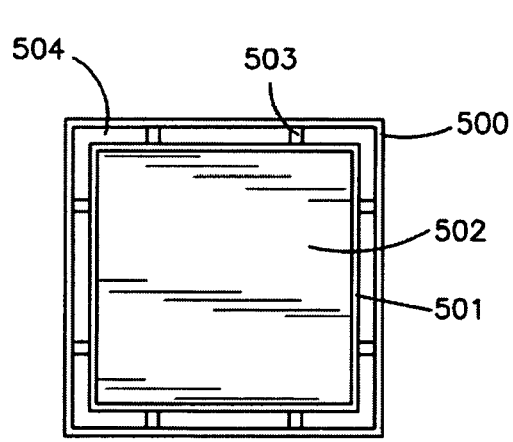
FIGS. 5a-5c are alternative example embodiments of the present invention having differently shaped outer rings.
Figure 5C:
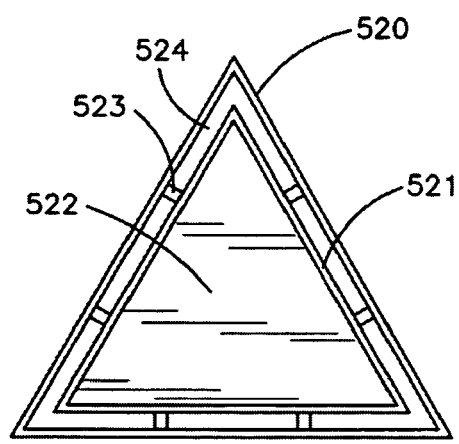
Figure 5B:
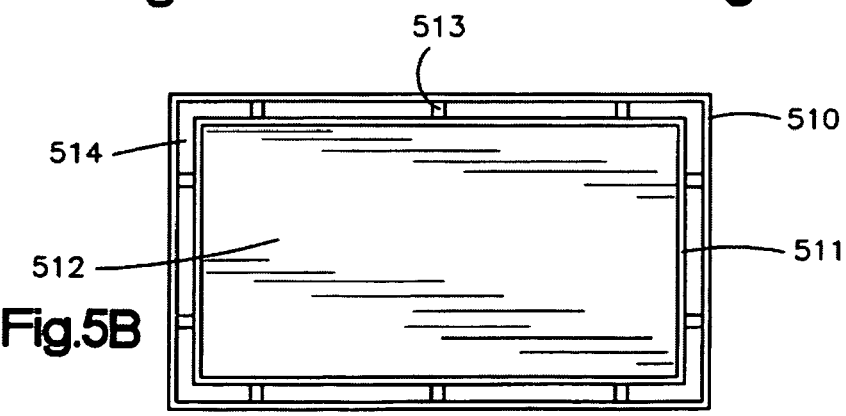

FIGS. 5a-5c show alternative embodiments of the present invention with the same novel principle of the invention shown in FIGS. 3(a)-3(b), with different shapes that may be preferred by different users.

FIG. 5(a) shows a square shaped pot 501 connected to a square shaped outer ring 500 by a connecting means 503. The striking plate 502 can also be of a square shape to be accommodated in the pot 501. The pot 501 has an internal sounding board (not shown) inside it, as in the embodiment shown in FIGS. 3(a)-3(b). The outer ring 500, pot 501, striking plate 502 and connecting means 503 are all similar to the embodiment described in FIGS. 3(a)-3(b), and can be made of the same materials, except that the shape of the outer ring 500, pot 501 and internal sounding board (not shown) is square rather than circular.

The bottom (not shown) of the pot 501 similarly has holes in it so that the internal sounding board can be seen from the holes. The connecting means 503 is preferably connected to the pot 501 at substantially equally spaced points around the perimeter of the square pot 501, as shown in FIG. 5(a). The number of points is preferably eight (two on each side of the square pot 501), but the pot 501 is connected to the outer ring 500 at least at one point, and can be connected up to an unlimited number of points. Similar to the embodiment described in FIGS. 3(a)-3(b), the turkey call may be manufactured to have cutouts or hollow spaces 504 throughout the perimeter of the outer ring 500.

FIG. 5(b) shows a rectangular shaped pot 511 connected to a rectangular shaped outer ring 510 by a connecting means 513. The striking plate 512 can also be of a rectangular shape to be accommodated in the pot 511. The pot 511 has an internal sounding board (not shown) inside it, as in the embodiment shown in FIGS. 3(a)-3(b). The outer ring 510, pot 511, striking plate 512 and connecting means 513 are all similar to the embodiment described in FIGS. 3(a)-3(b), and can be made of the same materials, except that the shape of the outer ring 510, pot 511 and internal sounding board (not shown) is rectangular rather than circular.

The bottom (not shown) of the pot 511 similarly has holes in it so that the internal sounding board can be seen from the holes. The connecting means 513 is preferably connected to the pot 511 at substantially equally spaced points around the perimeter of the rectangular pot 511, as shown in FIG. 5(*b*). The number of points is preferably ten (three each on the long side and two each on the short side of the rectangle pot 511), but the pot 511 is connected to the outer ring 510 at least at one point, and can be connected up to an unlimited number of points. Similar to the embodiment described in FIGS. 3(*a*)-3(*b*), the turkey call may be manufactured to have cutouts or hollow spaces 514 throughout the perimeter of the outer ring 510.

FIG. 5(*c*) shows a triangular shaped pot 521 connected to a triangular shaped outer ring 520 by a connecting means 523. The striking plate 522 can also be of a triangular shape to be accommodated in the pot 521. The pot 521 has an internal sounding board (not shown) inside it, as in the embodiment shown in FIGS. 3(*a*)-3(*b*). The outer ring 520, pot 521, striking plate 522 and connecting means 523 are all similar to the embodiment described in FIGS. 3(*a*)-3(*b*), and can be made of the same materials, except that the shape of the outer ring 520, pot 521 and internal sounding board (not shown) is triangular rather than circular.

The bottom (not shown) of the pot 521 similarly has holes in it so that the internal sounding board can be seen from the holes. The connecting means 523 is preferably connected to the pot 521 at substantially equally spaced points around the perimeter of the rectangular pot 521, as shown in FIG. 5(*c*). The number of points is preferably eight (two on each side of the triangle pot 521), but the pot 521 is connected to the outer ring 520 at least at one point, and can be connected up to an unlimited number of points. Similar to the embodiment described in FIGS. 3(*a*)-3(*b*), the turkey call may be manufactured to have cutouts or hollow spaces 524 throughout the perimeter of the outer ring 520.

Now, operation of the present invention will be described with references to the figures and components described above.

A user grips the outer ring 310, preferably with the non-dominant hand. For example, a right-handed person would grip the outer ring 310 with his left hand, and vice-versa. Then, the user would hold the handle of the striker 370 with the dominant hand, and scraping the striker 370 on the surface of the striking plate 320.

Different calls can be made using the turkey call 300 by different ways of scraping the striker 370 on the striking plate 320. A "yelp" can be made by making small circles with the striker 370 on the striking plate 320. A "cluck" can be made by making a quick and sharp pull on the striking plate 320. A "purr" can be made by dragging the striker 370 slowly across the striking plate 320. "Cutting" can be produced by doing fast and excited "clucking". The type of sound produced will depend on which call is made, and on which materials are used for the striking plate, striker, internal sounding board, pot, and outer ring. Different sounds will be produced by different combinations of the above.

The present invention provides several advantages that solves the problems with prior art methods. It provides the user with an outer ring that holds the pot securely so that the internal sounding board inside the pot is free to vibrate when the striking plate is scraped with the striker. In the prior art methods, the user would grip the pot with his hand directly. Thus, the internal sounding board inside the pot was not free to vibrate and was dampened by the grip of the user when the surface of the striking plate was scraped.

The present invention provides for an outer ring that holds the pot by being attached or connected to it at a minimum number of points such that the internal sounding board is free to vibrate, thus producing a better quality and a more natural sounding turkey call to lure turkeys for hunting purposes. The ring allows the vibrations created within the turkey call device (the pot) to be transmitted to the body of the pot undampened by the user's grasp. When the pot vibrates in a free manner in conjunction with the friction surface, striker, internal sounding chambers and internal sounding board, a sound more closely resembling that of the wild turkey is produced. Further, because a user grips the outer ring, it does not significantly matter how firm the user's grip is, as it will not affect the pot, striking plate and internal sounding board. Therefore, a user is able to obtain consistent and natural turkey call sounds each time he uses the turkey call device.

The above description of the present invention is only example embodiments of the invention. Various other combinations of turkey calls with outer rings are also possible. The outer ring may be of any shape, such as circular, oval, square, rectangular, triangular, hexagonal, etc., and can completely surround the pot or partially or substantially surround the pot (i.e., a segmented outer ring). The connecting means may be any apparatus or device that can be used to connect the material used for the outer ring with the material used for the pot or striking plate. The outer ring may be connected to the pot or striking plate at one point, or as many points to secure the pot as necessary while giving consideration to connecting at a minimum number of points to let the internal sounding board vibrate freely. The outer ring may be permanently attached or fixed to the pot or striking plate, or be detachable, such as using clips or a slidable mechanism as the connecting means. Further, a belt or strap may be used in lieu of the outer ring that attaches to an existing slate or friction turkey call, using some sort of adhesive or connecting means.

There are several other uses of the invention not limited as described above. The invention may also be applicable to other animals or have other uses in similar applications.

While there has been shown and described what is considered to be example embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A turkey call device for, when used, producing an artificial turkey sound, comprising:
    a pot for holding a striker plate to be acted upon by a striker to simulate the turkey sound, the pot including a bottom wall and a side wall, said bottom wall being spaced from said striker plate, and having a plurality of sound holes;
    a plurality of connectors extending outwardly from said pot, each of the connectors having a first end secured to said pot and a second end spaced from said pot; and
    an outer ring surrounding at least a portion of said pot, said outer ring being secured to said second end of at least some of said plurality of said connectors so as to be spaced away from and secured relative to said pot, said outer ring forming a holding device arranged so as to not attenuate the artificial turkey sound when held by a user and acted upon by the striker.

2. The turkey call device of claim 1 wherein said outer ring completely surrounds said pot so as to form a continuous ring around the pot, the periphery of said outer ring being greater than the outer periphery of said pot, said outer ring connected to the second ends of each of the plurality of connectors and being spaced from said pot around the entire periphery of said pot.

3. The turkey call device of claim 2 wherein said pot is circular and wherein said plurality of connectors are circumferentially spaced around said pot.

4. The turkey call device of claim 1 wherein said outer ring includes a plurality of segmented pieces.

5. The turkey call device of claim 1 further including an internal sounding board operatively coupled to said bottom wall of said pot.

6. The turkey call device of claim 1 wherein the striker plate is made of a material selected from the group consisting of slate, glass, ceramic material, and metal.

7. The turkey call device of claim 1 wherein said pot and plurality of connectors are made of a material selected from the group consisting of glass, frictionite, carbon, wood, and plastic.

8. The turkey call device of claim 1 wherein the striker plate is a substantially flat, circular disk.

9. The turkey call device of claim 1 wherein the striker plate is square in shape.

10. The turkey call device of claim 1 wherein the striker plate is triangular in shape.

11. The turkey call device of claim 1 wherein the striker plate is rectangular in shape.

12. The turkey call device of claim 1 further including said striker, said striker, when interacting with said striker plate, producing said artificial turkey sound.

13. A turkey call device for, when acted upon by a user using a striker tool, producing a turkey sound, comprising:
　a pot structure including,
　　a continuous side wall having an outer periphery; and
　　a striker plate attached to said side wall and having a surface covering for, when interacted with by the striker tool, producing the turkey sound;
　connectors extending outwardly from said side wall of said pot structure; and
　an outer ring secured to said connectors so as to be spaced away from said side wall of said pot structure, said outer ring permitting a user to hold the turkey call device without (1) touching said striker plate of said pot structure and (2) attenuating the turkey sound when the striker tool interacts with the surface of the striker plate of said pot structure.

14. The turkey call device of claim 13 wherein the outer ring is continuous and has outer periphery greater than the outer periphery of said side wall of said pot structure.

15. The turkey call device of claim 13 wherein the outer ring is segmented.

16. The turkey call device of claim 13 wherein the side wall of said pot structure and the outer ring are circular and wherein the connectors are circumferentially spaced around the side wall of said pot structure.

17. A turkey call device for producing a turkey sound, comprising:
　a pot including,
　　a continuous circular outer wall having an outer periphery; and
　　a striker plate, having a surface covering for, when interacted with by a striker tool, producing the turkey sound, said pot having a plurality of sound apertures;
　a plurality of radially projecting connectors extending outwardly from said pot, said plurality of radially projecting connectors being circumferentially spaced about said pot; and
　an outer continuously circular ring having an outer periphery greater than the outer periphery of said pot, said outer ring attached to said plurality of radially projecting connectors so as to maintain said outer ring spaced away from said pot, said outer ring permitting a user to hold the turkey call device without (1) touching said striker plate and said pot, and (2) attenuating the turkey sound.

* * * * *